(No Model.)
T. C. TOWNSEND.
WASTE PIPE AND FITTING.
No. 244,000. Patented July 5, 1881.
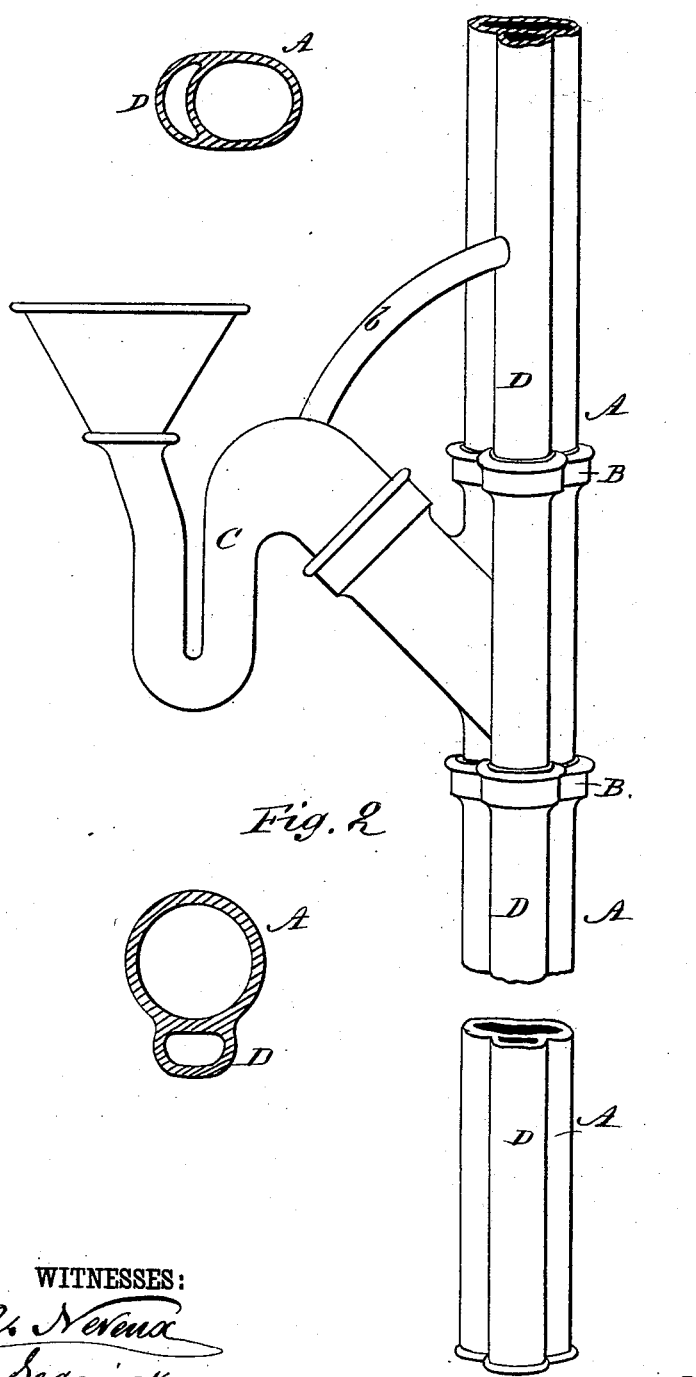
WITNESSES:
C. Neveux
C. Sedgwick
INVENTOR:
T. C. Townsend
BY Munn & Co
ATTORNEYS.

UNITED STATES PATENT OFFICE.

THOMAS C. TOWNSEND, OF NEW YORK, N. Y.

WASTE-PIPE AND FITTINGS.

SPECIFICATION forming part of Letters Patent No. 244,000, dated July 5, 1881.

Application filed December 10, 1880. (No model.)

*To all whom it may concern:*

Be it known that I, THOMAS C. TOWNSEND, of the city, county, and State of New York, have invented a new and useful Improvement in Waste-Pipes and Fittings, of which the following is a specification.

In plumbing arrangements of dwellings an air or ventilating pipe is usually provided, such pipe opening to the outer air and having connection with the upper portion of the waste-traps, so as to prevent them from being emptied by suction in the waste-pipe, and also to allow escape of gases. Such ventilating-pipes are necessarily an extra expense, both in material and labor of putting them in place.

The object of my invention is to provide a ventilating or air pipe, in connection with waste or soil pipes, which shall be less expensive and more readily applied than the separate pipe generally used.

In the drawings, Figure 1 is an elevation of the improved pipe as applied in connection with a basin. Fig. 2 is a cross-section of the pipe, and Fig. 3 a cross-section of a modified form of pipe. Fig. 4 is a side view, and Fig. 5 a cross-section of a second modification.

Similar letters of reference indicate corresponding parts.

A is the waste or soil pipe, made in sections, connected by fittings B.

C is a trap of usual character connected with the soil pipe, and D is the air or ventilating pipe, having a branch connection, b, to the crown of trap C, in the usual manner, to allow passage of air through the trap. The pipe D extends the whole length of the waste-pipe A, and will be open at the top, with a connection to the outer air.

The pipe A is made in sections of suitable length, preferably of cast-iron, though I do not limit myself in that respect, and has the pipe D cast with it, so that the pipe forms a separate and smaller pipe at one side.

The air-pipe may be a projection on one side of the larger pipe, as shown in Figs. 1 and 2; or the compound pipe may be circular or oval in cross-section and the air portion D formed by a partition, as shown in Figs. 3, 4, and 5. Other forms may be adopted, according to convenience of manufacture and place of use.

The fittings B are formed to correspond with the sections of pipe with a separate air-passage, so that when the sections of pipe are coupled the portions A D shall be continuous.

This combined waste and air pipe can be manufactured more cheaply than two separate pipes, and in fitting up the same for use the work is but little more than fitting an ordinary waste-pipe. The air or ventilating pipe can be provided also at less expense, for the reason that the air-pipes generally used are small, and consequently are made of lead instead of iron. The compound pipe has the additional advantage of occupying less room than two separate pipes.

Having thus fully described my invention, I claim as new and desire to secure by Letters Patent—

The combination, with sections D on waste-pipe sections A, of a trap, C, connected with said sections D by a pipe, b, as shown and described.

THOMAS C. TOWNSEND.

Witnesses:
 GEO. D. WALKER,
 C. SEDGWICK.